United States Patent [19]
Arlt et al.

[11] Patent Number: 5,579,922
[45] Date of Patent: Dec. 3, 1996

[54] MIXED CARGO CONVEYER (SORTER) FOR SORTING PIECES OF MIXED CARGO

[75] Inventors: Günther Arlt, Rheda-Wiedenbrück; Josef Van Essen, Sendenhorst; Werner Lutterbeck, Beckum, all of Germany

[73] Assignee: Bernhard Beumer Maschinenfabrik KG, Beckum, Germany

[21] Appl. No.: 378,295

[22] Filed: Jan. 25, 1995

[30] Foreign Application Priority Data

Jan. 26, 1994 [DE] Germany ............... 44 02 110.0

[51] Int. Cl.$^6$ ........................... B07C 5/16
[52] U.S. Cl. ............. 209/592; 209/646; 209/912
[58] Field of Search ........................... 209/592, 593, 209/594, 595, 646, 912; 177/52, 56, 57

[56] References Cited

U.S. PATENT DOCUMENTS

| | | | |
|---|---|---|---|
| 1,913,042 | 6/1933 | Redlinger | 209/646 |
| 2,252,909 | 8/1941 | Van Wyk | 209/646 |
| 2,980,252 | 4/1961 | Bray et al. | 209/646 |
| 4,426,006 | 1/1984 | Horii et al. | 209/593 |
| 4,583,636 | 4/1986 | Tas | 209/592 X |
| 4,830,195 | 5/1989 | De Greef | 209/646 |

FOREIGN PATENT DOCUMENTS 404081621A  3/1992  Japan .................... 209/593

*Primary Examiner*—D. Glenn Dayoan
*Attorney, Agent, or Firm*—Kenyon & Kenyon

[57] ABSTRACT

A mixed cargo conveyer (1) for sorting coded pieces of mixed cargo having a driven, endless conveyer track (8) which is a plurality of conveyer elements joined to one another by articulated joints, movable along a guideway (11), and each having a bearing element (12) supported by way of a supporting device (10) on the guideway (11) with a bearing surface (13) that is essentially horizontal in the conveying state for a piece of mixed cargo to be discharged at one designated discharge station (7) of a plurality of discharge stations (7) existing along the conveyer line, by tipping the bearing element (12) on its side; a plurality of loading stations (2), where pieces of mixed cargo to be sorted are each individually loaded onto the bearing surface (13) of an available conveyer element (9); and a computer, which is fed code information about the loaded pieces of mixed cargo read by a scanner, the bearing elements (12) each being able to move out of their normal transport position relative to their supporting device (10) upwards into a weighing position. A stationary weighing installation (6) of n electrical scales (14) is allocated to the conveyer track (8) upstream from the first discharge station (2), the scales (14) in each case have one weighing distance (w), which is longer than the dividing distance (t) between two adjacent conveyer elements (9). The conveyer track (8) having successive groups of n conveyer elements (9.1–9.4) each, of which the first conveyer element (9.1) of each group engages mechanically only with a first scale (14.1) for the purpose of weighing, the second conveyer element (9.2) only with a second scale (14.2), etc., and the nth conveyer element (9.4) only with the nth scale (14.4) of the weighing installation (6), while the conveyer elements (9) run through freely at each of the other scales (14) of the weighing installation (6).

20 Claims, 8 Drawing Sheets

MIXED CARGO CONVEYER (SORTER) FOR SORTING PIECES OF MIXED CARGO

BACKGROUND OF THE INVENTION

The invention relates to a mixed cargo conveyer, also called a sorter, for sorting coded pieces of mixed cargo, comprising a driven, endless conveyer track that consists of a plurality of conveyer elements, which are joined to one another by articulated joints, are movable along a guideway, and which each have a bearing element that is supported by way of a supporting device on the guideway with a bearing surface that is essentially horizontal in the conveying state for a piece of mixed cargo which is to be discharged at one designated discharge station of a plurality of discharge stations existing along the conveyer line (section) e.g. by tipping the bearing element on its side; comprising a plurality of loading stations, where pieces of mixed cargo to be sorted are each individually loaded onto the bearing surface of an available conveyer element; and comprising a computer, which is fed code information about the loaded pieces of mixed cargo read by a scanner for (further) processing.

DESCRIPTION OF THE PRIOR ART

Sorters of this type are known in various types of constructions and are widely used, e.g., for sorting packages at post offices or for sorting pieces of baggage at airports, but also for numerous other applications, to convey the pieces of mixed cargo, generally loaded at a plurality of loading stations manually or by a feeding device onto the sorter, in each case to a discharge station designated as the destination. Before being loaded onto the sorter, the pieces of mixed cargo are provided with a code (e.g. a bar code) that can be read by a scanner mounted on the sorter, which (code) contains, inter alia, information for the intended destination and, in interaction with a computer and an appropriate control system, makes it possible for the piece of mixed cargo to be discharged at the intended discharge station, after the code has been read by the scanner, a corresponding signal has been transmitted to the computer and has been processed in this computer, and the computer has transmitted a corresponding information to the control system, which causes the piece of mixed cargo to be discharged at the designated discharge station.

In many sorter applications, one is interested in determining the weight of each piece of mixed cargo to be sorted and in feeding this information to the computer for further use. Weight can be ascertained, for example, by using an electrical scale arranged upstream from each loading station, but a procedure of this type is actually extremely uneconomical, particularly when there are a large number of loading stations, since a corresponding number of scales is needed. Moreover, weighing the pieces of mixed cargo before they are loaded onto the sorter is often not only problematic from a standpoint of economics, but from a technical standpoint as well. This is because, among other things, in order to achieve high throughput capacities, modern sorters have conveyer rates of up to 2 m/s and, accordingly, are generally also loaded by loading devices that work just as fast in order to be able to utilize the sorting capacity. If, for example, a through-run (continuous) scale were integrated into the loading device, then this would unacceptably prolong the time required for the loading conveyer, since a certain dwell time on the scale is needed to be able to determine the weight of the piece of mixed cargo accurately enough. However, this would automatically reduce the loading capacity of the loading device, because a piece of mixed cargo must have left the through-run scale before the next piece of mixed cargo arrives on the scale. Often, loading devices combined with a weighing station are provided even for present-day, fast sorters due to the desire to determine the weight of the pieces of mixed cargo, although one could, per se, also carry out the loading operation with a corresponding number of manual loading stations.

From a standpoint of economics, the solution seems to present itself to ascertain the weight of the pieces of mixed cargo by configuring a stationary through-run scale on the conveyer track of the sorter between the last loading station and the first discharge station, since one can then make do with one single weighing installation, independent of the number of loading stations, as has already been proposed in the GB 21 26 356 A for a sorter that is not typical of the species for sorting fruits and vegetables. At best, however, such a refinement is practicable for very low-speed sorters and has to be ruled out for present-day, high-speed sorters, in particular, because the weighing distance (stretch) in such a construction can only be very short, as the scale may only measure the weight of one bearing element at a time, together with the piece of mixed cargo supported on it; thus, the immediately following conveyer element may not yet enter (run into) the weighing distance during the weighing operation, but, on the other hand, it must also be possible to determine its weight. An exact determination of weight is not possible with such a short weighing distance, particularly in the case of high-speed sorters.

SUMMARY OF THE INVENTION

The object of the present invention is to design a sorter according to the species defined at the outset, particularly one having a large number of loading stations, so as to enable a reasonably accurate determination of the weight of each of the pieces of mixed cargo to be sorted, while satisfying technical and economic requirements.

This objective is solved according to the invention in that the bearing elements are each able to move out of their normal transport position relative to their supporting device upwards into a weighing position; that a stationary weighing installation consisting of n electrical scales is allocated to the conveyer track ahead (upstream from) the first discharge station; that the scales in each case have one weighing distance w, which is longer than the dividing distance t between two adjacent conveyer elements, and that the conveyer track consists of successive groups of n conveyer elements each, of which the first conveyer element of each group engages mechanically only with a first scale for the purpose of weighing, the second conveyer element only with a second scale, etc., and the nth conveyer element only with the nth scale of the weighing installation, while the conveyer elements run through freely at each of the other scales of the weighing installation.

The length of the weighing distance of each scale is preferably equal to the multiple of the dividing distance of the conveyer elements, to have available a large enough standstill distance, as well as a large enough measuring distance for weighing. At the same time, one proceeds in such a way that—dependent upon the conveying speed of the sorter and the preselected dwell time of a piece of mixed cargo on the scales—one first of all preselects or determines the length of the desired weighing distance, divides this value by the spacing distance of the conveyer elements, and from this (possibly with appropriate rounding off) calculates the (integral) value n which determines the number of scales in the weighing installation and the number of conveyer elements per group of conveyer elements.

The individual scales of the weighing installation are preferably designed as belt conveyer scales having in each case two belt conveyers which are arranged with mutual horizontal clearance in a frame and driven synchronously to the conveyer track, and whose endless belts in each case circulate in a vertical plane and which are arranged in such a way that their carrying run juts out freely upwards over the frame joined to a weighing unit.

In a first refinement of this type, the bearing elements in each case are provided on their lower side with two guideways designed preferably as skids for accommodating the belts of the belt conveyers of the respective scale assigned to them, said guideways projecting so far downwards that, with the passing of the scale assigned to it, the bearing element runs onto (ascends) the scale's belt conveyers and is carried by these into weighing position, elevated relative to its supporting device, the guideways of each bearing element of each group of conveyor elements being arranged so as to be laterally displaced relative to the guideways of the remaining bearing elements of the group, and the belt conveyers of the scales being correspondingly arranged in a laterally displaced manner so that each belt conveyer of each scale is aligned in each case in the conveying direction to a guideway of the conveyer elements assigned to the respective scale.

In comparison with the aforesaid, another refinement according to the invention has the advantage that all the bearing elements can be designed to be completely identical, and that, nevertheless, in each case only one conveyer element from a group of (identical) conveyer elements is weighed by each scale of the weighing installation, while the other conveyer elements of the group pass this scale freely and engage just with the respective scale assigned to them. This refinement has the distinction that the height of the belts of the belt conveyers is increased in each case on their outer side turned away from the guide rollers by a support segment, whose length is essentially the same as the length of a bearing element, to such a height that a bearing element in its elevated weighing position is to be supported on its lower side by the support segment, and that the belt conveyers of each scale are so synchronized with the conveyer element assigned to it from each group of conveyer elements that the support segments of both its belts are at the run-on (ascending) end exactly when the conveyer element concerned reaches the belt conveyer of the scale assigned to it.

In order to prevent an unwanted relative movement of the bearing elements relative to their respective supporting device (and with that, unnecessary wear and noise generation) during the transport outside of the weighing region, the bearing elements are preferably locked at a locking station in their normal transport position and unlocked at an unlocking station arranged ahead of (upstream from) the weighing installation, as this is further explained below in an exemplary embodiment.

Furthermore, a lifting station between the unlocking station and the weighing installation and/or a lowering station between the weighing installation and the locking station can be provided for the bearing elements, by which means in each case the bearing elements are already to be raised upstream from the weighing installation into their weighing position to the support elevation of the belt conveyers or first lowered again into their normal transport position downstream from the weighing installation so that the weighing installation remains essentially spared from on and off impacts.

The scales of the weighing installation can be arranged lying one behind the other in the conveying direction. However, according to another refinement, they can also be arranged in such a way that their belt conveyers in the region of the conveyer track—viewed transversely to the conveying direction—lie essentially in alignment one behind the other. This refinement, in which the belt conveyers of all the scales of the weighing installation therefore lie with mutual clearance side-by-side in parallel is particularly useful when the weighing installation should/must be as short as possible because of given circumstances. At the same time, the belt conveyers are inwardly displaced in pairs relative to one another, in that the two respective belt conveyers of a first scale lie in the region of an outer lengthwise edge of the conveyer track, the two respective belt conveyers of the next scale are displaced inwardly relative to the adjacent belt conveyer of the first scale, etc., and the two belt conveyers of the last scale consequently lie completely inside side-by-side.

Further preferred refinements of the present invention are described in the dependent claims and explained in the light of exemplary embodiments with reference to a drawing. This shows in

DETAILED DESCRIPTION

Figure 1:
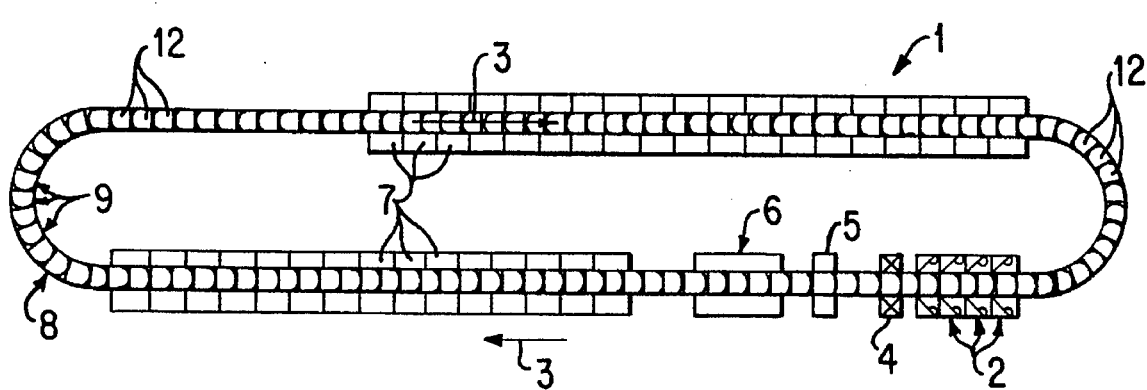
FIG. 1 A simplified schematic top view of a sorter.

FIG. 1 shows a strongly schematized top view of a sorter, designated as a whole with 1, for sorting pieces of mixed cargo not shown which are loaded onto the sorter at various loading stations 2, the loading being able to be carried out either manually or by (not shown) loading devices.

Downstream of the last loading station 2, in conveying direction 3, a scanning station 4 (scanner) is arranged in which the codes of the loaded pieces of mixed cargo are to be read. The information is routed to a computer which, inter alia, contains the information concerning at which station of the sorter 1 a particular piece of mixed cargo was loaded, and from that, in conjunction with the remaining data relayed to it, such as the conveying speed, can undertake a motion tracking for each loaded piece of mixed cargo.

Downstream of the scanning station 4, in conveying direction 3, a volume-measuring device 5 is arranged for determining the volumetric dimensions of each piece of mixed cargo loaded, and downstream of this, an electric weighing installation is arranged, designated as a whole with the numeral 6, and consisting of a plurality of scales 14, in which the weight of the individual pieces of mixed cargo is determined, as described in detail in the following. The volume and weight data is likewise fed to the computer which assigns it in suitable manner to the respective piece of mixed cargo.

Downstream of the weighing installation 6 are numerous discharge stations 7, each piece of mixed cargo being discharged at a specific discharge station 7 which is stipulated in its code.

The sorter 1 has an endless, driven conveyer track 8 which consists of a plurality of conveyer elements 9, that are joined to each other by articulated joints, which each have a bearing element 12 that is supported by way of a supporting device 10 on a guideway 11 with a bearing surface 13 that is essentially horizontal in the conveying state for supporting a piece of mixed cargo which is to be discharged by tipping the bearing element 12 on its side at the preselected discharge station 7. The tipping is effected each time by a tipping device not shown which is triggered at the preselected discharge station 7 by a control unit which obtains appropriate information from the computer and produces a corresponding tipping signal.

Figure 2:
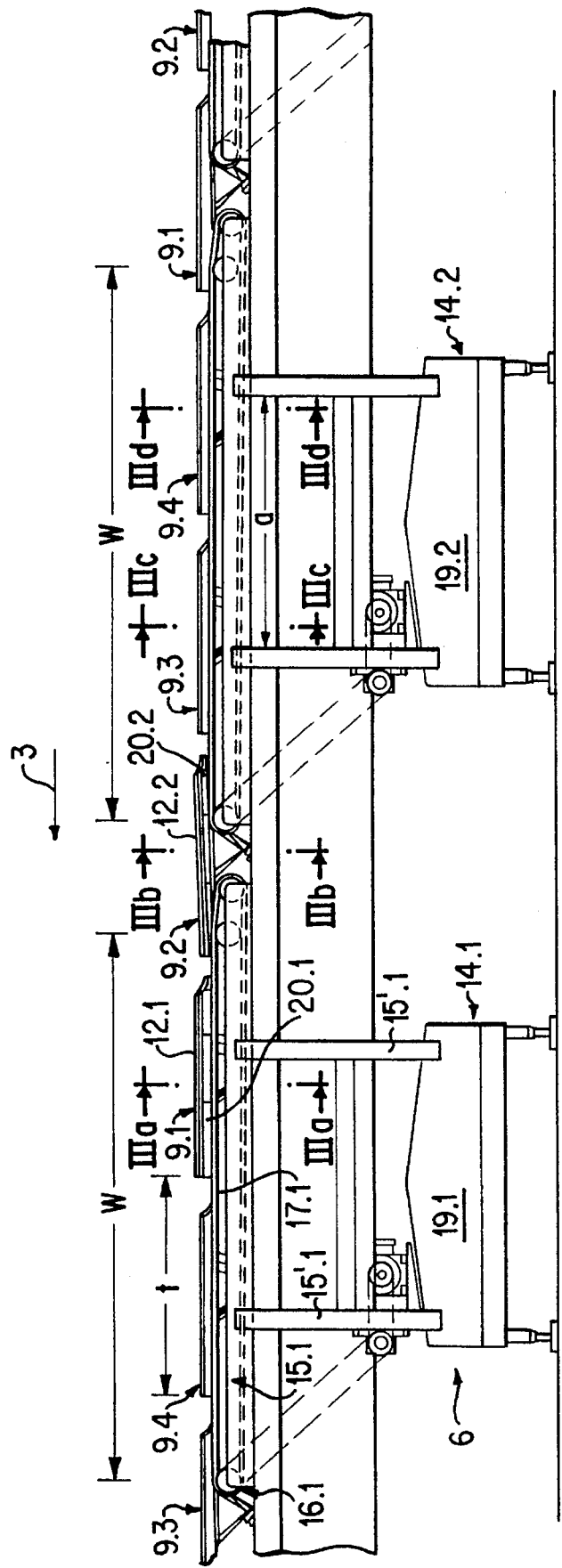
FIG. 2 A simplified partial side view of a first refinement of a sorter according to the invention in the region of its weighing installation, the individual scales of the weighing installation being arranged one behind the other in the conveying direction.

In the refinement according to FIG. 2–6, the weighing installation 6 assigned to the conveyer track 8 consists of n=4 scales 14 (=14.1–14.4), which each have a weighing distance w that is longer than the dividing distance t between two mutually adjacent conveyer elements 9, only two scales 14.1 and 14.2 being depicted in FIG. 2. The conveyer track 8 consists of consecutive groups of n=4 conveyer elements 9.1, 9.2, 9.3, and 9.4 respectively which are designed in such a way that the first conveyer element 9.1 of each group engages mechanically with only the first scale 14.1 of the weighing installation 6 for the purpose of weighing, the second conveyer element 9.2 only with the second scale 14.2, etc, and the last conveyer element 9.4 of the group 4 only with the fourth scale 14.4, while the conveyer elements 9 pass through freely each time at the other scales 14 of the weighing installation 6. The way this is effected is further described below.

The scales 14 are each designed as belt conveyer scales having in each case two belt conveyers 16 which are arranged with mutual horizontal clearance in a frame 15 and driven synchronously to the conveyer track 8, and whose endless belts 17 each circulate in a vertical plane, and which are arranged in such a way that their carrying run 18 protrudes freely upwards over the frame 15 joined to a weighing unit 19, so that they can engage each time with the bearing elements assigned to them.

The bearing elements 12 of the conveyer elements 9 are each capable of limited movement out of their normal (lowered) transport position, relative to their supporting device 10, upwards into a weighing position in which they are uncoupled from the remaining parts of the conveyer elements, and have in each case two parallel guideways 20 on their lower side for accommodating the belts 17 of the respective scale 14 assigned to them, which (guideways) protrude downward to the extent that, upon passing of the scale 14 assigned to it on its belt conveyers 16, each bearing element 12 runs onto 16 and is carried by this in weighing position, which is elevated relative to its supporting device 10, while it passes through freely at the other scales of the weighing installation 6.

The guideways 20 of each bearing element 12 of each group of conveyer elements 9.1–9.4 are arranged in a manner that they are laterally displaced relative to the guideways 20 of the remaining conveyer elements 9 or their bearing elements 12 of the group, the belt conveyers 16 of the scales 14 being arranged correspondingly so that each belt conveyer 16 of each scale 14 is aligned each time in the conveying direction 3 to a guideway 20 of a conveyer element 9 assigned to the scale 14 in question.

In order to show this clearly, FIG. 3a shows a section through the first conveyer element 9.1 of a group of conveyer elements 9.1, 9.2, 9.3 and 9.4 (see FIG. 2) and shows its bearing element 12.1 in the upper right section, while in the upper left section, the bearing element 12.2 of the conveyer element 9.2 following in conveying direction 3 is depicted. It is discernible that the guideways 20.1 of the first conveyer element 9.1 of each group of conveyer elements 9.1–9.4 are arranged so as to be adjacent to the side edges of the bearing element 12.1, and the guideways 20.2 of the second conveyer element 9.2 in each case are so inwardly displaced that, viewed in the conveying direction 3, they lie next to the guideways 20.1 of the first conveyer element 9.1, so that the guideways 20.1 are only able to engage with the belts of the belt conveyer 16.1 of the assigned scale 14.1, while they run in parallel past the belts 17 of the scales 14.2–14.4.

In corresponding manner, it is to be recognized from FIG. 3b that the guideways 20.3 are again arranged displaced further to the inside than the guideways 20.2, etc., and from FIG. 3d it can be discerned that the guideways 20.4 of the last (fourth) conveyer element 9.4 of the group are again followed by another group of conveyer elements 9.1–9.4 whose first conveyer element 9.1 again has guideways 20.1 which are arranged adjacent to the edges of its bearing element 12.1, etc., so that it can mechanically engage with the scale 14.1 for the purpose of weighing.

Each of the guideways 20 are designed as skids which are designed on their free lower side with a continuous longitudinal groove for accommodating the belt 17 of a belt conveyer 16. At the same time, the belts 17 of the belt conveyers 16 are supported between their guide locations, which are designed as rollers 21, by a slide bar 22 secured to the respective scales-frame 15 (see FIG. 6), the belts being designed as round belts having a circular cross-section.

Figure 3:
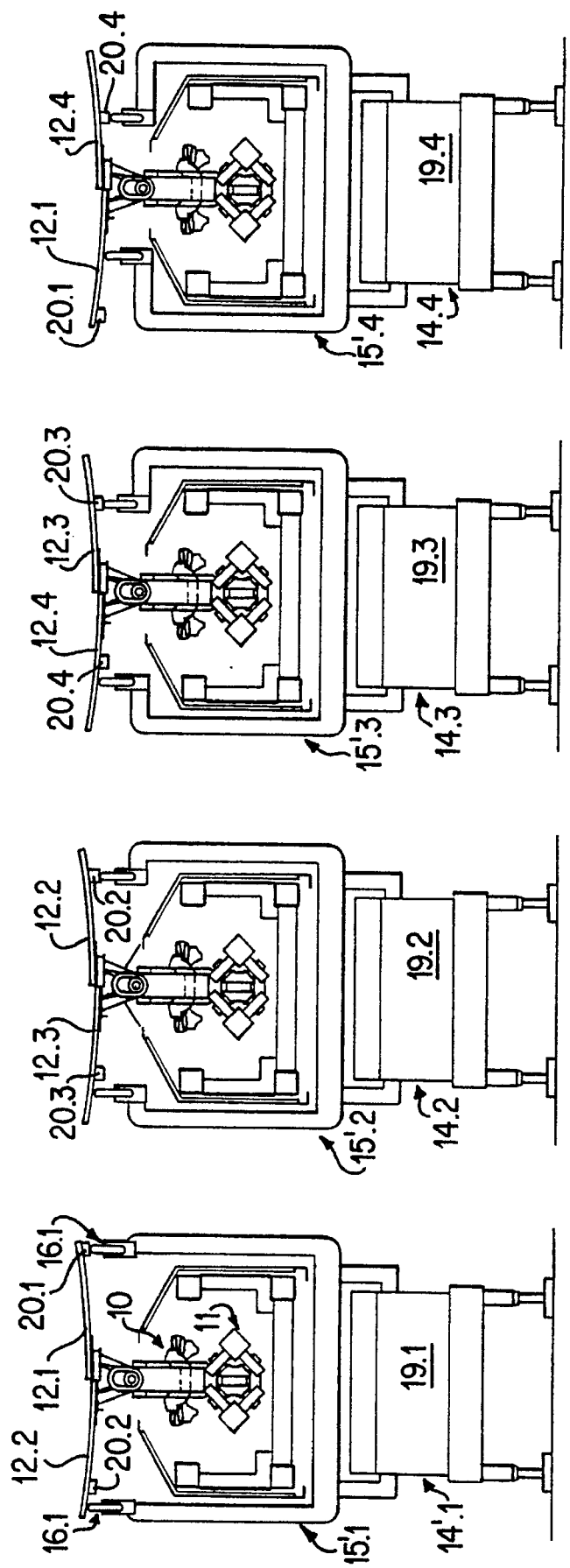
FIG. 3 Sectional views a), b), c) and d) according to the lines of intersection IIIa—IIIa or IIIb—IIIb or IIIc—IIIc or IIId—IIId in FIG. 2, the view of the bearing element of the following conveyer element being depicted each time in the upper left section.

As is revealed from FIG. 3, the belt conveyers 16 of each scale 14 are arranged in each case at the free limb ends of two essentially U-shaped frame sections 15' which wrap around the sorter 1 and are fastened at their lower end section to the respective weighing unit 19, thus, the frame section 15'.1 to a weighing unit 19.1, the frame section 15'.2 to a weighing unit 19.2, etc.

Figure 4:
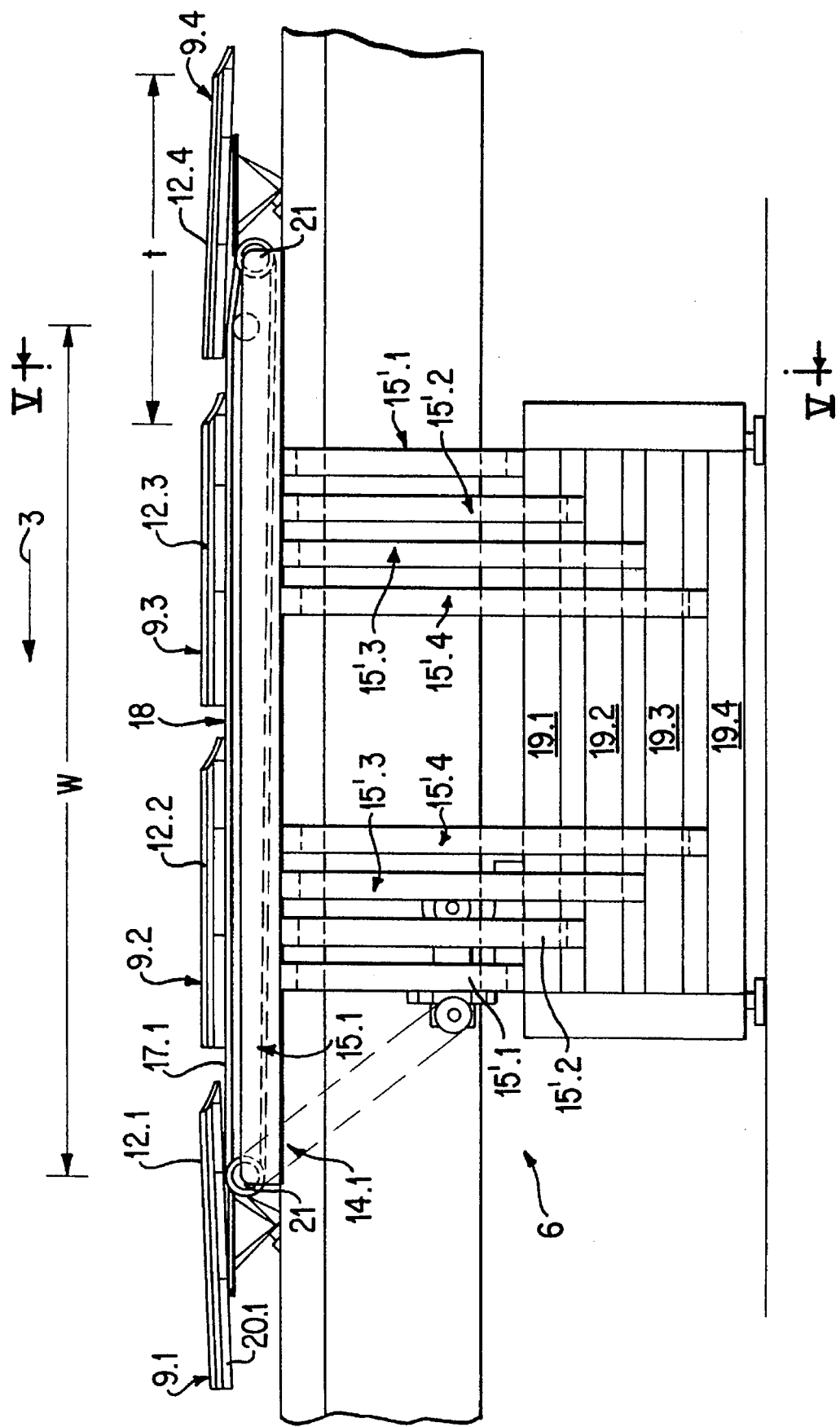
FIG. 4 A simplified/schematic display corresponding to FIG. 2 of a refinement according to FIG. 2 and 3, in which the belt conveyers and with that, the weighing distances of the individual scales, viewed transversely to the conveying direction, are lying parallel one behind the other.
Figure 6:
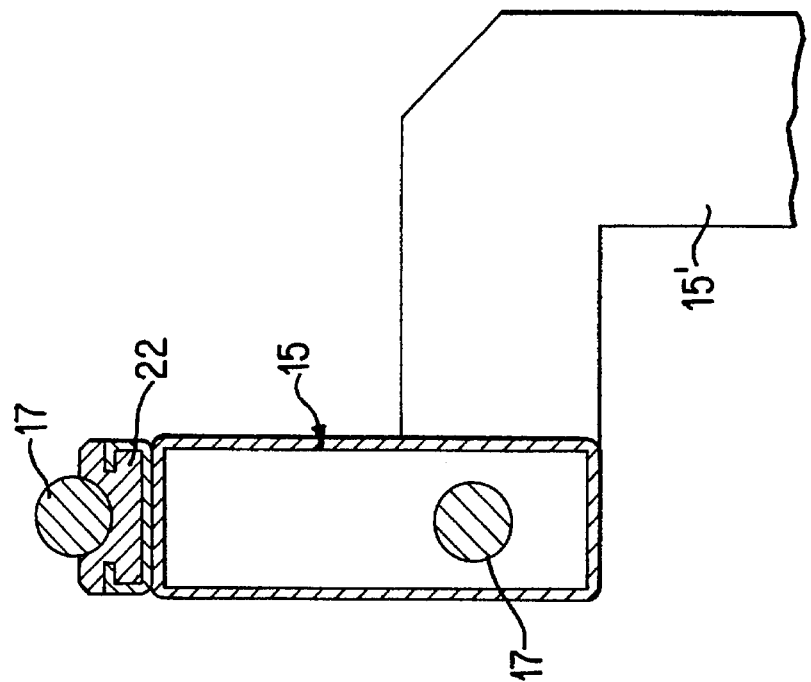
FIG. 6 A cross-sectional, partial representation, enlarged in comparison with FIG. 2 through 5, of a belt conveyer of the weighing installation according to FIG. 2 through 5.
Figure 5:
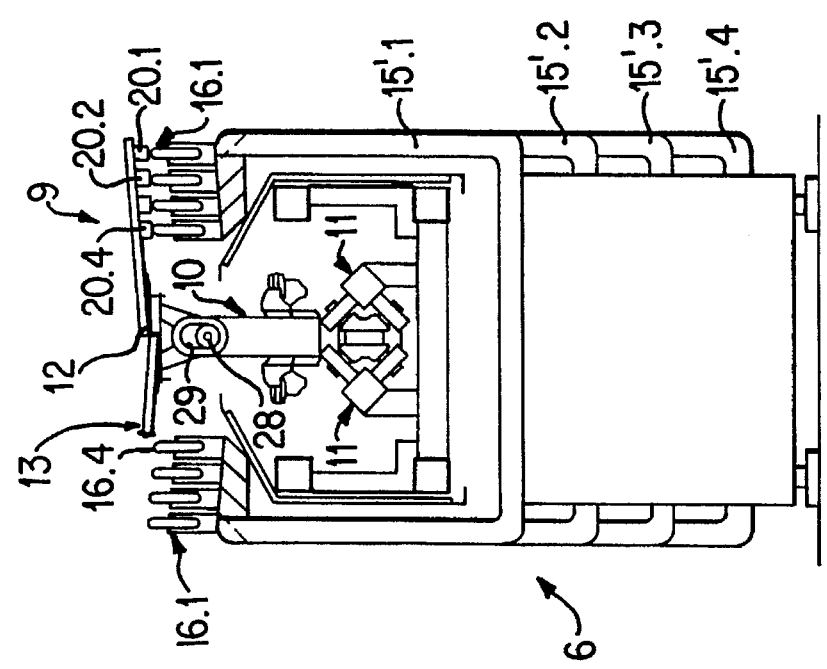
FIG. 5 A simplified cutaway portion representation of the arrangement according to FIG. 4 viewed in the direction of the line of intersection IV—IV in FIG. 4.

FIG. 2 shows a refinement in which the four scales 14.1–14.4 are arranged one behind the other in the conveying direction 3, while FIGS. 4 and 5 show a construction in which the scales 14 of the weighing installation 6 are so arranged that their belt conveyers 16—viewed transversely to the conveying direction 3—lie in alignment one behind the other, but at the same time, viewed in the same manner transversely to the conveying direction, are displaced relative to one another in pairs as in the construction according to FIGS. 2, 3 (see FIG. 5).

The belt conveyers 16 of each scale 14 are provided with a separate drive and therefore are operable independently of one another.

In FIGS. 2 and 3 a condition is represented in which the bearing element 12.1 of the leading first conveyer element 9.1 of a group of four conveyer elements 9.1–9.4 is in elevated weighing position on the belts 17.1 of the belt conveyer 16.1 of the front-lying scale 14.1 in conveying direction 3 of the weighing installation 6. The belts 17.1 are each supported in the region of the weighing distance w on the slide bar 22 assigned to them (see FIG. 6), so that the weight of the bearing element 12.1 and the piece of mixed cargo not shown resting on it are transferred via the frame sections 15'.1 to the weighing unit 19.1 of this scale 14.1. The weighing unit 19.1 routes an appropriate signal to the computer not shown which corresponds to the gross weight of the bearing element 12.1 and the piece of mixed cargo resting on it. Since the net weight of the bearing element 12 is determinable in advance and accordingly known, the net weight of the respective piece of mixed cargo can be easily calculated from this by the computer.

Moreover, a precise weighing is possible, since the length of the weighing distance w is equal to the multiple of the length of the bearing elements 12, so that after the respective run-on of a bearing element 12 onto the scale 14 assigned to it, a large standstill distance or settling period of time is available within which the dynamic impact stress resulting from the run-on dies away, and after that, a sufficiently great weight-measuring distance is available.

On the other hand, the bearing elements of the conveyer elements 9.2–9.4 of this and each other group of conveyer elements cannot engage mechanically with the scale 14.1 for the purpose of weighing, since their (belt-) guideways 20 are arranged in a manner that they are laterally displaced relative to the belts 17.1 of the first scale 14.1, so that they cannot engage with these and therefore freely pass the scale 14.1 in their normal lowered conveying position.

Furthermore, it is recognizable from FIG. 2 that the bearing element 12.2 of the following conveyer element 9.2 is just leaving the scale 14.2 assigned to it and in doing so, falls out of its elevated weighing position there into its normal transport position again. After that—as explained—it passes freely through the first scale 14.1, in the same way as the conveyer elements 9.3 and 9.4 of this and each subsequent group of conveyer elements 9. In corresponding manner, the conveyer elements 9.1, 9.3 and 9.4 of each group pass through the second scale 14.2, etc., so that consequently, in each case, only one single conveyer element 9 of each group engages with its bearing element 12 with each scale 14.

The equivalent holds true for the refinement according to FIGS. 4 and 5, in which the individual scales 14.1–14.14 of the weighing installation 6, viewed transversely to the conveying direction 3, lie in alignment one behind the other in the region of the conveyer track 8. In FIG. 4, a condition is represented in which the bearing element 12.1 of the conveyer element 9.1 of a group of conveyer elements 9.1–9.4 is just leaving the belts 17.1 of the scale 14.1 assigned to it, thus is returned out of its elevated weighing position into its lowered, normal conveying position, while the bearing element 12.4 of the last conveyer element 9.4 of this group is just being raised out of its lowered, normal transport position into its elevated weighing position, and the bearing elements 12.2 and 12.3 of the conveyer elements 9.2 or 9.3 are in their elevated weighing position. At the same time, however, the bearing elements 12.2, 12.3 and 12.4 are not supported on the belts 17.1 of the scale 14.1 assigned to the conveyer element 9.1, but rather by the inwardly displaced belts of the scale 14.2 or 14.3 or 14.4 respectively assigned to them (see FIG. 5), which are not visible in FIG. 4, since they are arranged displaced to the back relative to the drawing plane, as emerges from FIG. 5, in which the bearing elements 12 (lying one behind the other in conveying direction 3) are depicted each time in the upper right section in their weighing position, and in the upper left section are sketched in their lowered, normal conveying position. Moreover, the bearing elements 12 in each case are guided by a plug 28 in an elongated hole 29 in their supporting device 10.

FIGS. 7 through 10 show a refinement which differs in numerous respects from that described till now, here also, as in the refinement according to FIGS. 4 and 5, the scales 14 of the weighing installation 6 lying not one behind the other in conveying direction 3, as in the case of the refinement according to FIGS. 2 and 3, but rather being arranged in such a way that their belt conveyers 16, viewed transversely to the conveying direction 3, are lying one behind the other, inserted into one another (imbricated).

Figure 7:
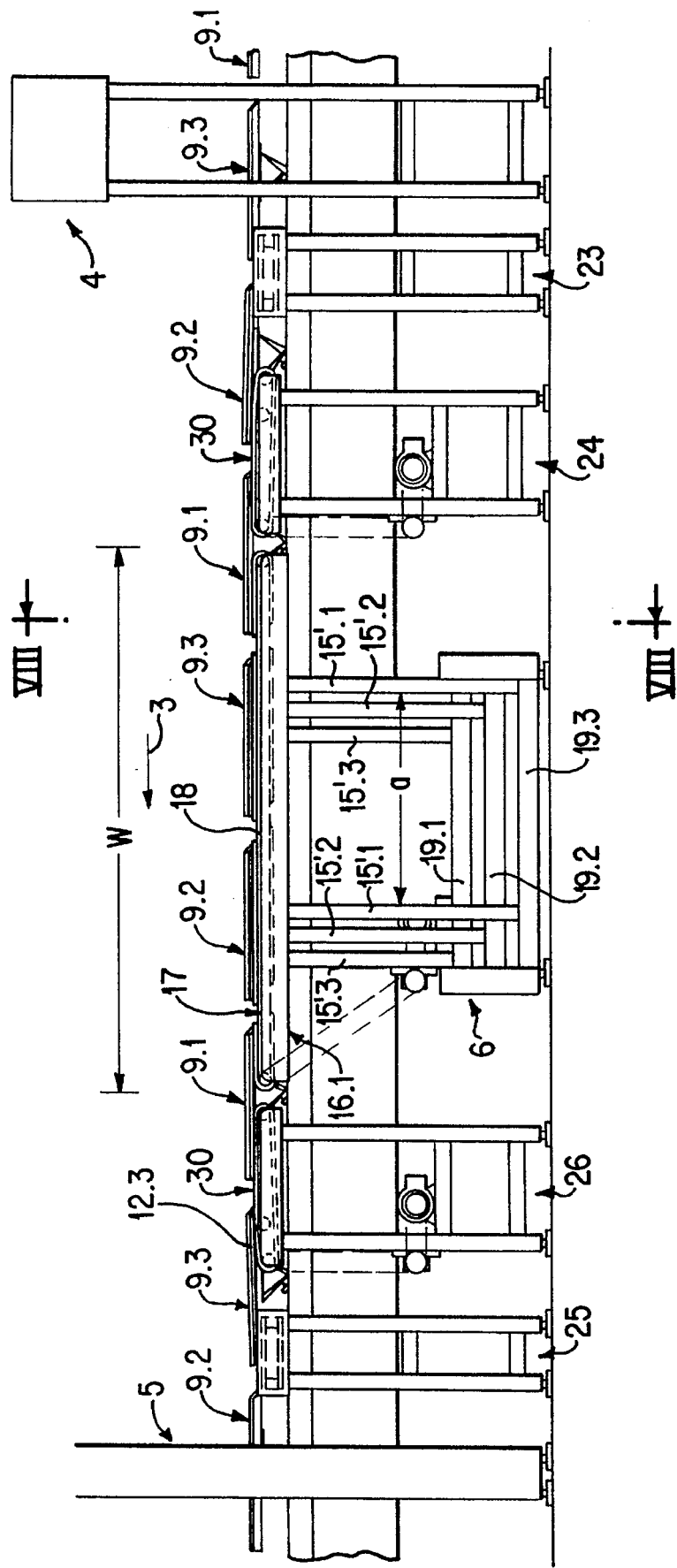
FIG. 7 A simplified, partial side view of another refinement of the sorter according to the invention in the region of its weighing installation, all the bearing elements being identically designed.

In this refinement, each group of conveyer elements 9 has just n=3 conveyer elements 9.1–9.3, so that the weighing installation 6 also consists of just three scales 14. The correspondingly smaller weighing distance w, with the same length of the conveyer elements 9, is made possible in particular because a lifting station 24 is arranged directly before the weighing installation 6, by means of which the arriving conveyer elements 9 are already lifted out of their normal, lowered conveying position into their weighing position, so that in each case they run on practically without bumping from the lifting station 24 onto the belts 17 of the scale 14 assigned to them, and therefore a shorter standstill distance suffices. For this, the lifting station 24 has two belt conveyers 30 which are arranged with mutual clearance parallel to one another in conveying direction 3, the carrying run of the belt conveyers 30 being at a height which corresponds with the elevated weighing position of the bearing elements 12. In FIG. 7, a conveyer element 9.2 is just running onto the belt conveyers 30, while the bearing elements of the following conveyer elements 9.3, 9.1, etc are still in their normal transport position.

In addition, the sorter according to FIGS. 7 through 10 differs from the refinements described above because all the conveyer elements 9 are identically designed and are not provided with belt guideways 20 on their lower side. Nevertheless, to assure that each conveyer element 9 of each group of conveyer elements 9.1–9.3 respectively is weighed only at the scale 14 of the weighing installation 6 assigned to it and is able to pass through freely at the remaining scales, so that in each case the desired weighing distance w is available when weighing, the height h of the belts 17 of the belt conveyers 16 is increased in each case on their outer side turned away from the guide rollers 21 by a support segment 27, whose length L is essentially the same as the length of a bearing element 12, to such a height H (see FIG. 9) that a bearing element 12 resting with its lower side on the support segments 27 is supported in its elevated weighing position. At the same time, the belt conveyers 16 of each scale 14 are so synchronized with the respective conveying element 9 assigned to it from each group 9.1–9.3 of conveyer elements that the support segments 27 of its two belts are just at the run-on end when the conveyer element in question reaches the belt conveyer 16 of the scale 14 assigned to it.

Figure 9:
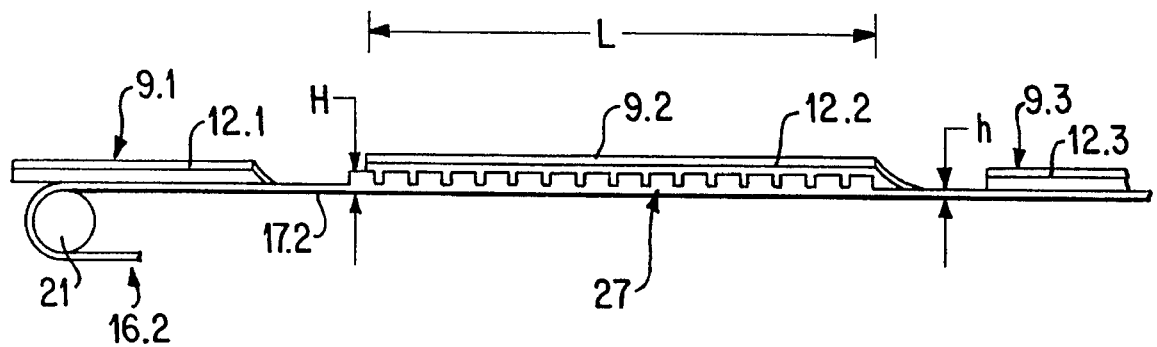
FIG. 9 A simplified, partial sectional view of a belt conveyer of the weighing installation utilized in FIG. 7 and 8.
Figure 10:
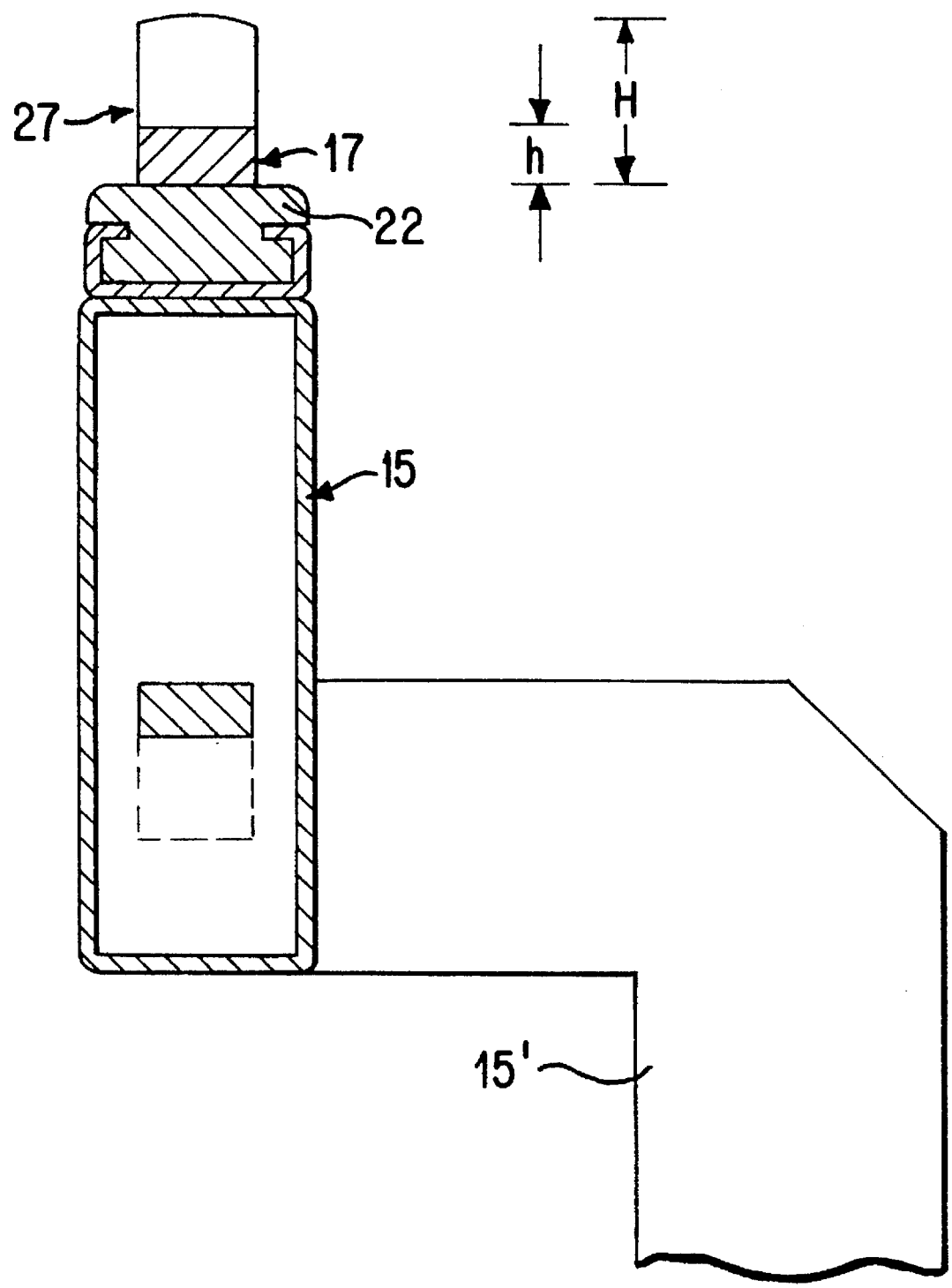
FIG. 10 a cross-sectional, partial representation of a belt conveyer, enlarged in comparison with FIG. 9, of the weighing installation according to FIG. 7 through 9.

In FIG. 9 it is discernible that, for example, the bearing element 12.2 of a conveyer element 9.2 is supported in its elevated weighing position on the support segments 27 of the belts 17.2 of the belt conveyers 16.2 of the scale 14.2 assigned to the conveyer element 9.2, while the bearing element 12.1 of the preceding conveyer element 9.1 and the bearing element 12.3 of the following conveyer element 9.3 are in their lowered transport position, because they are each running outside of the support segments 27, in synchronism with the belt conveyer 16.2. However, this representation was only selected for clarification and holds true only when the individual scales 14.1–14.3 of the weighing installation 6 are arranged one behind the other in conveying direction, as is the case in the refinement according to FIGS. 2 and 3. Because in the case of the refinement according to FIG. 7, in which the belt conveyers 16.1–16.3 of the scales 14.1–14.3 are lying one behind the other transversely to the conveying direction, naturally in the region of the scale 6, the bearing element 12 of each conveyer element 9.1–9.3 is in elevated weighing position, but in each case on a different scale, so that the full weighing distance w is available for each scale 14.1–14.3.

In addition, the refinement according to FIG. 7 differs from those previously discussed because a lowering station 26 is arranged downstream from the weighing installation 6, which is designed similarly to the lifting station 24. The lowering station 26 also has belt conveyers 30 which accept the bearing elements 12, in each case still in elevated weighing position, from the weighing installation 6, so that in descending (running off) there is also no dynamic impact on the weighing installation 6. The front-lying section in conveying direction 3 of the belt conveyers 30 of the lowering station 27 is bent a little downwards, so that a bearing element 12 (in FIG. 7, the bearing element 12.3 of a conveyer element 9.3) running off from the lowering station 26 is conveyed again into its lowered, normal transport position. The belt conveyers 30 of the lifting station 24 are designed in mirror symmetry to that.

Downstream from the lowering station 26, a locking station 25 is arranged in conveying direction 3, at which the bearing element 12 of a conveyer element 9 running off from the lowering station 26 is locked with its supporting device 10. This can be carried out in various ways, for instance by actuating a locking bracket, a locking pin, or suchlike. This measure has proven to be advisable, so that there is no unnecessary wear and noise generated during the normal transport outside of the weighing installation 6 because of relative movements between the bearing element 12 and the supporting device 10.

Therefore, an unlocking station 23 is arranged directly before the lifting station 24, in which the locking is again removed so that the bearing element 12 of the respective conveyer element 9 can be conveyed into the weighing position, relative to its supporting device 10.

Upstream from the unlocking station 23 is the scanning station 4 for reading the codes of the pieces of mixed cargo not shown, and downstream from the locking station 25 is a volume-measuring device 5, by means of which, the respective dimensions of a piece of mixed cargo passing through is to be determined, this data also being routed to the computer not shown and there being assigned to the respective piece of mixed cargo.

Figure 8:
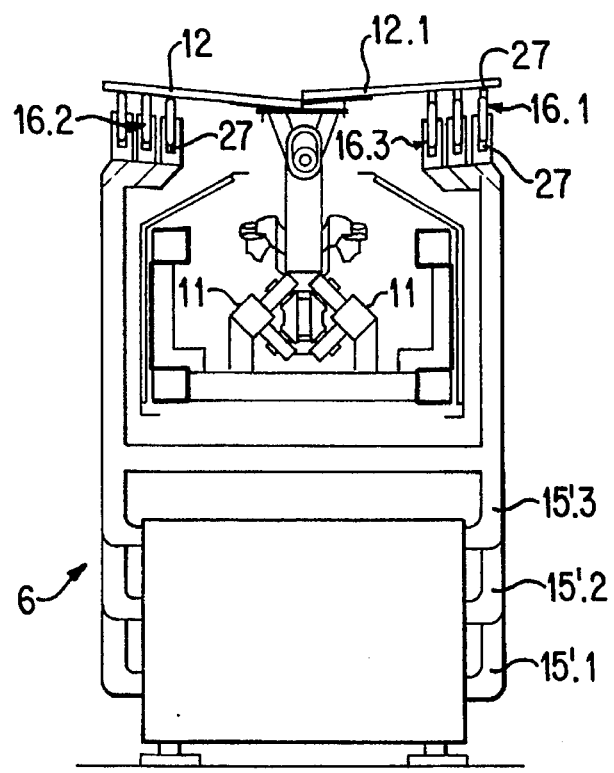
FIG. 8 A cross-section view of the sorter according to FIG. 7 viewed in the direction of the line of intersection VIII—VIII in FIG. 7.

From the cross-sectional representation according to FIG. 8, which is enlarged compared to FIG. 7, it is to be recognized that in the design according to FIG. 7, the bearing elements 12.1–12.3 lying one behind the other in conveying direction 3 are indeed weighed simultaneously, but that this is carried out in each case at a different scale of the weighing installation 6 (see FIG. 8, top right). At the same time, it should just be mentioned that the belts 17 of the belt conveyers 16 of the individual scales 14 can also possibly be provided in each case with two or more support segments 27 arranged with mutual clearance to one another, as is sketched in FIG. 8, upper right. This depends upon the length of the belt conveyers 16 and the dividing distance t between the adjacent conveyer elements 9. What is important here is that the design be so selected that, in synchronism with a conveyer element 9 feeding from the lifting station 24 into the weighing installation 6, in each case, at the run-on end of the scale 14 in question, support segments 27 of its belts 17 feed in when the bearing element 12 in question of the scale 14 in question is delivered for weighing.

For the sake of completeness, it should just be mentioned that in FIG. 8, upper left, the bearing elements 12 lying one behind the other are sketched in their lowered, normal conveying position, and that the belt conveyers 16 are shown there in a condition in which their support segments 27 are not engaged with bearing elements 12. As explained, in the case of the formation according to FIG. 7, this condition does not arise in the region of the weighing installation 6, but rather only when, as in the refinement according to FIG. 2, the scales 14 are arranged behind one another in conveying direction 3, since in the refinement according to FIG. 7, all the bearing elements 12 located in the region of the weighing installation 6 are in elevated weighing position with the pieces of mixed cargo on them.

It should just be added that in the refinement according to FIG. 7 (as in the refinement according to FIG. 3, and different from the refinement according to FIG. 4), the frame sections 15' of each scale 14 have in each case the same clearance a to one another, which, with identical design of the weighing units 19, has proven to be expedient.

It is easily recognizable that, because of the design according to the invention, the pieces of mixed cargo loaded onto the sorter 1, even given a plurality of loading stations 2, can be weighed with great accuracy using only a single weighing installation 6, since the length of the weighing distance w can be selected independently from the length of the bearing elements and is generally selected from the multiple of the dividing distance t between adjacent conveyer elements 9, so that when weighing, a sufficiently great standstill and weight-measuring distance is available each time over which the weight can be determined with high accuracy. At the same time, it is nevertheless possible to weigh each piece of mixed cargo, because the individual scales 14 of the weighing installation 6 are acted upon in each case by only one conveyer element 9 of a group and the piece of mixed cargo resting on it, while the following conveyer elements of the group run past the respective scale 14 without influencing it in any way and indeed, independently of whether the individual scales 14 of the weighing installation 6 are arranged behind one another in conveying direction 3 of the sorter 1, or are, as it were, so "pushed together" that their belt conveyers 16, viewed transversely to the conveying direction 3, lie aligned one behind the other.

We claim:

1. A mixed cargo conveyer for sorting coded pieces of mixed cargo, comprising a driven, endless conveyer track that consists of a plurality of conveyer elements, which are joined to one another by articulated joints, are movable along a guideway, and which each have a bearing element that is supported by way of a supporting device on the guideway with a bearing surface that is essentially horizontal in the conveying state for a piece of mixed cargo which is to be discharged at one designated discharge station of a plurality of discharge stations existing along the conveyer line, by tipping the bearing element on its side; comprising a plurality of loading stations, where pieces of mixed cargo to be sorted are each individually loaded onto the bearing surface of an available conveyer element; and comprising a computer, which is fed code information about the loaded pieces of mixed cargo read by a scanner wherein the bearing elements are each able to move out of their normal transport position relative to their supporting device upwards into a weighing position; and wherein a stationary weighing installation consisting of n electrical scales is allocated to the conveyer track ahead of the first discharge station; and the scales in each case have one weighing distance, which is longer than the dividing distance between two adjacent conveyer elements; and the conveyer track consists of successive groups of n conveyer elements each, of which the first conveyer element of each group engages mechanically only with a first scale for the purpose of weighing, the second conveyer element only with a second scale, and the nth conveyer element only with the nth scale of the weighing installation, while the conveyer elements run through freely at each of the other scales of the weighing installation.

2. The mixed cargo conveyer according to claim 1, wherein the length of the weighing distance of each scale is equal to a multiple of the dividing distance of the conveyer elements.

3. The mixed cargo conveyer according to claim 1, wherein the bearing elements are locked in their lowered, normal transport position to prevent them from being lifted up vertically relative to the supporting device of said bearing elements.

4. The mixed cargo conveyer according to claim 3, wherein an unlocking station is arranged upstream from the weighing installation at which the bearing elements of the conveyer elements are unlocked each time from the supporting device of said bearing elements.

5. The mixed cargo conveyer according to claim 4, wherein between the unlocking station and the weighing installation, a lifting station is arranged at which the bearing elements are lifted out of their lowered transport position into their weighing position before reaching the weighing installation.

6. The mixed cargo conveyer according to claim 3, wherein a locking station is arranged downstream from the weighing installation at which the bearing elements, which are lowered from their elevated weighing position into their transport position, are locked again with the supporting device of said bearing elements.

7. The mixed cargo conveyer according to claim 6, wherein a lowering station is arranged between the weighing installation and the locking station at which the bearing elements are lowered from their elevated weighing position into their normal transport position after leaving the weighing installation.

8. The mixed cargo conveyer according to claim 1, wherein the scales are belt conveyer scales each having two belt conveyers which are arranged with mutual horizontal clearance in a frame and are driven synchronously to the conveyer track, and each of whose endless belts circulate in a vertical plane and are arranged in such a way that their carrying run juts out freely upwards over the frame joined to a weighing unit.

9. The mixed cargo conveyer according to claim 8, wherein the bearing elements in each case are provided on their lower side with two guideways for accommodating the belts of the respective scale assigned to them, which guideways protrude downward to the extent that, with the passing of the scale assigned to it, the bearing element runs onto the scale's belt conveyers and is carried by its belts in its weighing position, elevated relative to its supporting device, the guideways of each bearing element of each group of conveyer elements being arranged in a manner that they are laterally displaced relative to the guideways of the remaining bearing elements of the group, and the belt conveyers of the scales being correspondingly arranged in a manner that they are laterally displaced relative to each other so that each belt conveyer of each scale is aligned in each case in conveying direction to a guideway of a conveyer element assigned to the respective scale.

10. The mixed cargo conveyer according to claim 9, wherein the guideways of the first conveyer element of each group of conveyer elements are arranged adjacent to the side edges of the bearing element in question, and in each case the guideways of the second conveyer element are so inwardly displaced that, viewed in the conveying direction, they lie next to the guideways of the first conveyer element.

11. The mixed cargo conveyer according to claim 9, wherein the guideways are designed as skids which are formed with a continuous longitudinal groove on their free lower side for accommodating the belt of a belt conveyer.

12. The mixed cargo conveyer according to claim 8, wherein the height of each belt of the belt conveyers is increased on its outer side turned away from the guide rollers by a support segment whose length is essentially the same as the length of a bearing element, to such a height that a bearing element in its elevated weighing position is to be supported on its lower side by the support segment; and wherein the belt conveyers of each scale are so synchronized with the conveyer element assigned to it from each group of conveyer elements that the support segments of both its belts are at the run-on ascending end exactly when the conveyer element in question reaches the belt conveyer of the scale assigned to it.

13. The mixed cargo conveyer according to claim 12, wherein in the region of their support segments, the belts are designed as toothed belts.

14. The mixed cargo conveyer according to claim 8, wherein the belts of the belt conveyer are supported in each case between their guide locations by a slide bar secured to the scales-frame.

15. The mixed cargo conveyer according to claim 8, wherein the belt conveyers of a scale are arranged in each case at the upper free limb ends of essentially U-shaped frame sections, which wrap around the sorter and are fastened at their lower end section to a weighing unit of the scale.

16. The mixed cargo conveyer according to claim 15, wherein the belt conveyers of the scales in each case are supported by two frame sections at the respective weighing unit of the scale, the mutual horizontal clearance of the frame sections being identical for all scales.

17. The mixed cargo conveyer according to claim 8, wherein the belt conveyers of each scale are provided with a separate drive.

18. The mixed cargo conveyer according to claim 1, wherein each group of conveyer elements consists of at least 3 conveyer elements.

19. The mixed cargo conveyer according to claim 1, wherein the scales of the weighing installation are arranged one behind the other in the conveying direction.

20. The mixed cargo conveyer according to claim 1, wherein the scales of the weighing installation are so arranged that their belt conveyers in the region of the conveyer track lie essentially aligned one behind the other when viewed transversely to the conveying direction.

* * * * *